(12) United States Patent
Reid

(10) Patent No.: US 11,702,271 B2
(45) Date of Patent: Jul. 18, 2023

(54) VACUUM INSULATED ARTICLES WITH REFLECTIVE MATERIAL ENHANCEMENT

(71) Applicant: Concept Group LLC, Wellesley, MA (US)

(72) Inventor: Aarne H Reid, Jupiter, FL (US)

(73) Assignee: Concept Group LLC, Wellesley, MA (US)

( * ) Notice: Subject to any disclaimer, the term of this patent is extended or adjusted under 35 U.S.C. 154(b) by 0 days.

(21) Appl. No.: 15/448,964

(22) Filed: Mar. 3, 2017

(65) Prior Publication Data

US 2017/0253416 A1 Sep. 7, 2017

Related U.S. Application Data

(60) Provisional application No. 62/375,953, filed on Aug. 17, 2016, provisional application No. 62/303,519, filed on Mar. 4, 2016.

(51) Int. Cl.
*B65D 81/38* (2006.01)
*B32B 5/02* (2006.01)
(Continued)

(52) U.S. Cl.
CPC ........ *B65D 81/3841* (2013.01); *A47J 41/022* (2013.01); *B32B 1/02* (2013.01);
(Continued)

(58) Field of Classification Search
CPC ... B65D 81/3841; B32B 15/043; B32B 15/20; B32B 18/00; B32B 1/02; B32B 5/024; B32B 9/041; B32B 1/08; B32B 3/08; B32B 9/005; B32B 15/04; B32B 15/18; B32B 2307/308; B32B 2255/06; B32B 2457/00; B32B 2307/734; B32B 2307/416; B32B 2439/40; F17C 3/08; F17C 2203/032; F17C 13/001; F17C 2201/0109; F17C 2201/0114; F17C 2201/0119; F17C 2201/0128; F17C 2201/0138; F17C 2201/0157; F17C 2201/054; F17C 2201/056; F17C 2203/0316; F17C 2203/0391
(Continued)

(56) References Cited

U.S. PATENT DOCUMENTS

| 1,362,805 | A | 12/1920 | Kruse |
| 1,457,504 | A | 6/1923 | Cullen et al. |

(Continued)

FOREIGN PATENT DOCUMENTS

| CN | 101119673 A | 2/2008 |
| CN | 101666407 A | 3/2010 |

(Continued)

OTHER PUBLICATIONS

Overview of NAS Battery for Load Management; CEC Energy Storage Workshop, Feb. 2005, pp. 1-22.

(Continued)

*Primary Examiner* — King M Chu
(74) *Attorney, Agent, or Firm* — BakerHostetler

(57) ABSTRACT

Provided are vacuum-insulated articles that comprise an evacuated space disposed between first and second walls and a reflective material disposed within the evacuated space. Also provided are methods of fabricating such articles.

17 Claims, 9 Drawing Sheets

(51) Int. Cl.

| | | |
|---|---|---|
| B32B 18/00 | (2006.01) | |
| F17C 1/12 | (2006.01) | |
| B32B 15/20 | (2006.01) | |
| B32B 3/08 | (2006.01) | |
| F17C 1/14 | (2006.01) | |
| A47J 41/02 | (2006.01) | |
| B32B 3/06 | (2006.01) | |
| B65D 65/40 | (2006.01) | |
| B32B 3/26 | (2006.01) | |
| B32B 9/04 | (2006.01) | |
| B32B 3/02 | (2006.01) | |
| F17C 3/08 | (2006.01) | |
| B32B 3/28 | (2006.01) | |
| F17C 13/00 | (2006.01) | |
| B32B 15/08 | (2006.01) | |
| B32B 1/08 | (2006.01) | |
| B32B 15/04 | (2006.01) | |
| B32B 1/02 | (2006.01) | |
| B32B 9/00 | (2006.01) | |
| B32B 15/18 | (2006.01) | |

(52) U.S. Cl.
CPC .................. *B32B 1/08* (2013.01); *B32B 3/02* (2013.01); *B32B 3/06* (2013.01); *B32B 3/08* (2013.01); *B32B 3/266* (2013.01); *B32B 3/28* (2013.01); *B32B 5/022* (2013.01); *B32B 5/024* (2013.01); *B32B 5/026* (2013.01); *B32B 9/005* (2013.01); *B32B 9/041* (2013.01); *B32B 15/04* (2013.01); *B32B 15/043* (2013.01); *B32B 15/08* (2013.01); *B32B 15/18* (2013.01); *B32B 15/20* (2013.01); *B32B 18/00* (2013.01); *B65D 65/40* (2013.01); *B65D 81/38* (2013.01); *F17C 1/12* (2013.01); *F17C 1/14* (2013.01); *F17C 3/08* (2013.01); *F17C 13/001* (2013.01); *B32B 2250/02* (2013.01); *B32B 2250/03* (2013.01); *B32B 2250/04* (2013.01); *B32B 2250/05* (2013.01); *B32B 2250/40* (2013.01); *B32B 2250/44* (2013.01); *B32B 2255/00* (2013.01); *B32B 2255/06* (2013.01); *B32B 2255/205* (2013.01); *B32B 2307/304* (2013.01); *B32B 2307/308* (2013.01); *B32B 2307/31* (2013.01); *B32B 2307/416* (2013.01); *B32B 2307/734* (2013.01); *B32B 2439/40* (2013.01); *B32B 2457/00* (2013.01); *B32B 2605/08* (2013.01); *B32B 2605/12* (2013.01); *B32B 2605/18* (2013.01); *F17C 2201/0109* (2013.01); *F17C 2201/0114* (2013.01); *F17C 2201/0119* (2013.01); *F17C 2201/0128* (2013.01); *F17C 2201/0138* (2013.01); *F17C 2201/0157* (2013.01); *F17C 2201/054* (2013.01); *F17C 2201/056* (2013.01); *F17C 2203/032* (2013.01); *F17C 2203/0316* (2013.01); *F17C 2203/0391* (2013.01); *F17C 2203/0629* (2013.01); *F17C 2223/0161* (2013.01); *F17C 2223/033* (2013.01); *F17C 2260/033* (2013.01)

(58) Field of Classification Search
USPC .......................... 220/592.27, 560.12, 592.21
See application file for complete search history.

(56) References Cited

U.S. PATENT DOCUMENTS

| | | |
|---|---|---|
| 1,615,649 A | 1/1927 | Prindle |
| 2,085,737 A | 7/1937 | Cereghino |
| 2,225,660 A | 12/1940 | Rogers |
| 2,362,893 A | 11/1944 | Durst |
| 2,363,893 A | 11/1944 | Baptiste |
| 2,573,594 A | 10/1951 | Nofzinger |
| 2,666,979 A | 1/1954 | Van Dusen |
| 2,722,336 A | 11/1955 | Aaron et al. |
| 2,807,074 A | 9/1957 | Schroeder |
| 2,845,199 A | 7/1958 | Putman et al. |
| 2,867,242 A | 1/1959 | Harris et al. |
| 3,068,026 A | 12/1962 | McKamey |
| 3,090,463 A | 5/1963 | Yanda |
| 3,119,238 A | 1/1964 | Chamberlain et al. |
| 3,137,143 A | 6/1964 | Jacobs et al. |
| 3,146,005 A | 8/1964 | Peyton |
| 3,152,452 A | 10/1964 | Bond et al. |
| 3,195,564 A | 7/1965 | Carney et al. |
| 3,207,533 A | 9/1965 | Gundy et al. |
| 3,265,236 A | 8/1966 | Gibbon et al. |
| 3,440,830 A | 4/1969 | Wright et al. |
| 3,457,723 A | 7/1969 | Kerns |
| 3,460,512 A | 8/1969 | Keichler et al. |
| 3,490,496 A | 1/1970 | Thornton |
| 3,510,323 A | 5/1970 | Bosso et al. |
| 3,622,846 A | 11/1971 | Reimers |
| 3,706,208 A | 12/1972 | Kadi et al. |
| 3,736,936 A | 6/1973 | Basiulis et al. |
| 3,760,142 A | 9/1973 | Schoenthaler |
| 3,799,440 A | 3/1974 | Goss et al. |
| 3,913,623 A | 10/1975 | Siegwart |
| 3,915,478 A | 10/1975 | Al et al. |
| 3,943,618 A | 3/1976 | Perkins |
| 3,988,029 A | 10/1976 | Gibson |
| 4,055,268 A | 10/1977 | Barthel |
| 4,086,665 A | 5/1978 | Poirier |
| 4,117,201 A | 9/1978 | Keifert |
| 4,136,222 A * | 1/1979 | Jonnes ................. B29D 24/005 428/116 |
| 4,138,027 A * | 2/1979 | Frye ...................... A47J 41/028 220/592.27 |
| 4,151,828 A | 5/1979 | Mather et al. |
| 4,154,363 A | 5/1979 | Barthel |
| 4,157,779 A | 6/1979 | Arashi et al. |
| 4,171,634 A | 10/1979 | Perkins |
| 4,200,199 A | 4/1980 | Perkins et al. |
| 4,303,105 A | 12/1981 | Rohner |
| 4,332,401 A * | 6/1982 | Stephenson ............. F16L 59/21 138/149 |
| 4,396,211 A | 8/1983 | McStravick et al. |
| 4,399,919 A | 8/1983 | Posnansky |
| 4,450,872 A * | 5/1984 | Orcutt ...................... B32B 18/00 138/144 |
| 4,491,347 A | 1/1985 | Gustafson |
| 4,515,397 A | 5/1985 | Nowobilski et al. |
| 4,538,337 A | 9/1985 | Holbrook et al. |
| 4,653,469 A | 3/1987 | Miyaji et al. |
| 4,696,104 A | 9/1987 | Vanzetti et al. |
| 4,746,054 A | 5/1988 | Moats et al. |
| 4,819,970 A | 4/1989 | Umehara |
| 4,827,596 A | 5/1989 | Rakieski |
| 4,903,631 A | 2/1990 | Morris |
| 4,919,299 A | 4/1990 | Haines |
| 4,953,632 A | 9/1990 | Sakaya et al. |
| 4,997,124 A * | 3/1991 | Kitabatake ............. F16L 59/065 228/184 |
| 5,007,217 A | 4/1991 | Glover et al. |
| 5,038,706 A | 8/1991 | Morris |
| 5,052,816 A | 10/1991 | Nakamura et al. |
| 5,108,390 A | 4/1992 | Potocky et al. |
| 5,206,705 A | 4/1993 | Tokura |
| 5,235,817 A | 8/1993 | Gallagher et al. |
| 5,393,260 A | 2/1995 | Barth |
| 5,411,897 A | 5/1995 | Harvey et al. |
| 5,520,682 A | 5/1996 | Baust et al. |
| 5,524,630 A * | 6/1996 | Crowley ................ A61B 5/416 600/466 |
| 5,562,154 A | 10/1996 | Benson et al. |
| 5,573,140 A | 11/1996 | Satomi et al. |
| 5,600,752 A | 2/1997 | Lopatinsky |
| 5,650,020 A | 7/1997 | Ohta et al. |
| 5,674,218 A | 10/1997 | Rubinsky et al. |

(56) References Cited

U.S. PATENT DOCUMENTS

| | | |
|---|---|---|
| 5,704,401 A | 1/1998 | Fukui et al. |
| 5,712,010 A | 1/1998 | Russek et al. |
| 5,742,048 A | 4/1998 | Kobayashi et al. |
| 5,862,973 A | 1/1999 | Wasserman |
| 5,869,801 A | 2/1999 | Paton et al. |
| 5,870,823 A | 2/1999 | Bezama et al. |
| 5,893,404 A | 4/1999 | Brown et al. |
| 5,983,950 A | 11/1999 | Aoki et al. |
| 6,050,443 A | 4/2000 | Tung |
| 6,095,405 A | 8/2000 | Kim et al. |
| 6,109,518 A | 8/2000 | Mueller et al. |
| 6,139,571 A | 10/2000 | Fuller et al. |
| 6,145,547 A | 11/2000 | Villatte |
| 6,166,907 A | 12/2000 | Chien |
| 6,186,390 B1 | 2/2001 | Tadauchi et al. |
| 6,203,764 B1 | 3/2001 | Benson |
| 6,216,745 B1 | 4/2001 | Augustynowicz et al. |
| 6,257,282 B1 | 7/2001 | Emmer et al. |
| 6,360,935 B1 | 3/2002 | Flake |
| 6,413,164 B1 | 7/2002 | Vogl et al. |
| 6,706,037 B2 | 3/2004 | Zvuloni et al. |
| 6,875,209 B2 | 4/2005 | Zvuloni et al. |
| 6,936,045 B2 | 8/2005 | Yu et al. |
| 7,064,429 B2 | 6/2006 | Bemmerl et al. |
| 7,139,172 B2 | 11/2006 | Bezama et al. |
| 7,143,788 B2 | 12/2006 | Keyes |
| 7,150,743 B2 | 12/2006 | Zvuloni et al. |
| 7,203,064 B2 | 4/2007 | Mongia et al. |
| 7,207,985 B2 | 4/2007 | Duong et al. |
| 7,258,161 B2 | 8/2007 | Cosley et al. |
| 7,298,623 B1 | 11/2007 | Kuczynski et al. |
| 7,322,378 B2 | 1/2008 | Chen et al. |
| RE40,049 E | 2/2008 | Li |
| 7,334,630 B2 | 2/2008 | Goodson et al. |
| 7,354,434 B2 | 4/2008 | Zvuloni et al. |
| 7,356,434 B2 | 4/2008 | Wu et al. |
| 7,361,187 B2 | 4/2008 | Duong et al. |
| 7,374,063 B2 * | 5/2008 | Reid ................ F25B 9/02 220/592.27 |
| 7,393,350 B2 | 7/2008 | Maurice |
| 7,419,085 B2 | 9/2008 | Fukunaka et al. |
| 7,431,896 B2 | 10/2008 | Biel, Jr. et al. |
| 7,451,785 B2 | 11/2008 | Taira et al. |
| 7,460,369 B1 | 12/2008 | Blish, II et al. |
| 7,485,117 B2 | 2/2009 | Damasco et al. |
| 7,497,365 B2 | 3/2009 | Kimura et al. |
| 7,510,534 B2 | 3/2009 | Burdorff et al. |
| 7,515,415 B2 | 4/2009 | Monfarad et al. |
| 7,562,679 B2 | 7/2009 | Yasuda et al. |
| 7,608,071 B2 | 10/2009 | Duong et al. |
| 7,621,889 B2 | 11/2009 | Duong et al. |
| 7,621,890 B2 | 11/2009 | Duong et al. |
| 7,681,299 B2 | 3/2010 | Reid |
| 7,909,227 B2 | 3/2011 | Duong et al. |
| 7,980,171 B2 | 7/2011 | Groll |
| 8,353,332 B2 | 1/2013 | Reid |
| 8,434,665 B2 | 5/2013 | Motomura et al. |
| 8,569,622 B2 | 10/2013 | Katou et al. |
| 9,243,726 B2 | 1/2016 | Reid |
| 9,463,918 B2 | 10/2016 | Reid |
| 9,874,303 B2 | 1/2018 | Reid |
| 10,160,184 B2 * | 12/2018 | Conolly ................ B32B 5/024 |
| 10,495,250 B2 | 12/2019 | Reid |
| 11,008,153 B2 | 5/2021 | Reid |
| 11,204,127 B2 | 12/2021 | Reid |
| 2001/0030225 A1 | 10/2001 | Nagata |
| 2002/0089177 A1 | 7/2002 | Bonn |
| 2002/0114937 A1 | 8/2002 | Albert et al. |
| 2003/0079554 A1 | 5/2003 | Van Cleve |
| 2003/0146224 A1 | 8/2003 | Fujii et al. |
| 2004/0129756 A1 | 7/2004 | Zakel et al. |
| 2004/0226979 A1 | 11/2004 | Sato et al. |
| 2005/0211711 A1 | 9/2005 | Reid |
| 2006/0054234 A1 | 3/2006 | White |
| 2006/0054243 A1 | 3/2006 | Walton |
| 2006/0061092 A1 | 3/2006 | Keyes |
| 2006/0071052 A1 | 4/2006 | Conlon et al. |
| 2006/0076389 A1 | 4/2006 | Kemper et al. |
| 2006/0086773 A1 | 4/2006 | Sanftleben et al. |
| 2006/0213566 A1 | 9/2006 | Johnson |
| 2006/0282039 A1 | 12/2006 | Duong et al. |
| 2007/0012374 A1 | 1/2007 | Yasuda et al. |
| 2007/0102477 A1 | 5/2007 | Prince |
| 2007/0102478 A1 | 5/2007 | Prince |
| 2007/0235497 A1 | 10/2007 | Hsu |
| 2007/0235498 A1 | 10/2007 | Hsu |
| 2007/0235499 A1 | 10/2007 | Hsu |
| 2007/0246510 A1 | 10/2007 | Hsu |
| 2008/0006598 A1 | 1/2008 | Fujii et al. |
| 2008/0036076 A1 | 2/2008 | Ouyang |
| 2008/0061111 A1 | 3/2008 | Kiriyama |
| 2008/0083816 A1 | 4/2008 | Leinbach et al. |
| 2008/0121642 A1 | 5/2008 | Reid |
| 2008/0169037 A1 | 7/2008 | Ziegler |
| 2008/0197170 A1 | 8/2008 | Prince |
| 2008/0285230 A1 | 11/2008 | Bojan et al. |
| 2009/0000681 A1 | 1/2009 | Averbuch et al. |
| 2009/0007789 A1 | 1/2009 | Hirai et al. |
| 2009/0031659 A1 | 2/2009 | Kalfon |
| 2009/0065499 A1 | 3/2009 | England |
| 2009/0068070 A1 | 3/2009 | Hashimoto et al. |
| 2009/0123221 A1 | 5/2009 | Marshall |
| 2009/0152331 A1 | 6/2009 | Schmitt et al. |
| 2010/0057064 A1 | 3/2010 | Baust et al. |
| 2010/0057067 A1 | 3/2010 | Baust et al. |
| 2010/0076421 A1 | 3/2010 | Baust et al. |
| 2010/0096037 A1 | 4/2010 | Lee et al. |
| 2010/0229992 A1 | 9/2010 | Witz et al. |
| 2010/0258290 A1 | 10/2010 | Bass |
| 2011/0056582 A1 | 3/2011 | Walle et al. |
| 2011/0233219 A1 | 9/2011 | Proskey |
| 2011/0264084 A1 | 10/2011 | Reid |
| 2012/0085070 A1 | 4/2012 | Chou et al. |
| 2012/0090817 A1 | 4/2012 | Reid |
| 2012/0175007 A1 | 7/2012 | Pan et al. |
| 2012/0228364 A1 | 9/2012 | Vegelahn |
| 2012/0282792 A1 | 11/2012 | Schlogl |
| 2012/0318808 A1 | 12/2012 | McCormick |
| 2013/0105496 A1 | 5/2013 | Jung |
| 2013/0199757 A1 | 8/2013 | Meyer et al. |
| 2013/0312865 A1 | 11/2013 | Baur et al. |
| 2013/0341359 A1 | 12/2013 | Vanier |
| 2014/0008417 A1 | 1/2014 | Visser et al. |
| 2014/0090737 A1 | 4/2014 | Reid |
| 2014/0182608 A1 | 7/2014 | Egoyants et al. |
| 2014/0216485 A1 | 8/2014 | Egoyants et al. |
| 2015/0110548 A1 | 4/2015 | Reid |
| 2015/0149800 A1 | 5/2015 | Gendler et al. |
| 2015/0151893 A1 | 6/2015 | Wengreen et al. |
| 2015/0159800 A1 | 6/2015 | Kimura et al. |
| 2015/0168050 A1 | 6/2015 | Cur et al. |
| 2015/0260332 A1 | 9/2015 | Reid |
| 2015/0271927 A1 | 9/2015 | Cocklin et al. |
| 2015/0345930 A1 | 12/2015 | Ikeda et al. |
| 2015/0356730 A1 | 12/2015 | Grove et al. |
| 2016/0044963 A1 | 2/2016 | Saleem |
| 2016/0050784 A1 | 2/2016 | Koizumi et al. |
| 2016/0084425 A1 | 3/2016 | Reid |
| 2016/0279725 A1 | 9/2016 | Azdasht |
| 2016/0341360 A1 | 11/2016 | Uraguchi et al. |
| 2016/0354853 A1 | 12/2016 | Azdasht |
| 2016/0368072 A1 | 12/2016 | Senga et al. |
| 2017/0030498 A1 | 2/2017 | Chu |
| 2017/0043938 A1 | 2/2017 | Reid |
| 2017/0062774 A1 | 3/2017 | Reid |
| 2017/0106414 A1 | 4/2017 | Hamilton |
| 2017/0120362 A1 | 5/2017 | Reid et al. |
| 2017/0165773 A1 | 6/2017 | Azdasht et al. |
| 2017/0225276 A1 | 8/2017 | Reid |
| 2017/0253416 A1 | 9/2017 | Reid |
| 2017/0305641 A1 | 10/2017 | Bodum |
| 2017/0336154 A1 | 11/2017 | Yagi et al. |
| 2017/0358079 A1 | 12/2017 | Gillies et al. |
| 2018/0106414 A1 | 4/2018 | Reid |

(56) References Cited

U.S. PATENT DOCUMENTS

| | | |
|---|---|---|
| 2018/0106529 A1 | 4/2018 | Cur et al. |
| 2019/0242289 A1 | 8/2019 | Otsuki et al. |
| 2020/0191319 A1 | 6/2020 | Reid et al. |
| 2020/0393076 A1 | 12/2020 | Reid et al. |

FOREIGN PATENT DOCUMENTS

| | | |
|---|---|---|
| CN | 202001825 U | 10/2011 |
| CN | 103896621 A | 7/2014 |
| CN | 208090184 U | 11/2018 |
| CN | 209839500 U | 12/2019 |
| DE | 3630399 A1 | 3/1988 |
| DE | 4324051 A1 | 1/1995 |
| DE | 10019420 A1 | 10/2001 |
| DE | 202010008131 U1 | 10/2010 |
| EP | 0611614 A1 | 8/1994 |
| EP | 1294022 A2 | 3/2003 |
| EP | 1619436 A2 | 1/2006 |
| EP | 1643180 A1 | 4/2006 |
| EP | 2957804 A1 | 12/2015 |
| FR | 2550313 A1 | 2/1985 |
| FR | 2597571 A1 | 10/1987 |
| FR | 2777630 A1 | 10/1999 |
| GB | 1034671 A | 6/1966 |
| GB | 2105226 A | 3/1983 |
| JP | 60-007822 A | 1/1985 |
| JP | 02-074223 A | 3/1990 |
| JP | 06-142909 A | 5/1994 |
| JP | 09-296723 A | 11/1997 |
| JP | 10-231970 A | 9/1998 |
| JP | 11-044389 A | 2/1999 |
| JP | 2003-156267 A | 5/2003 |
| JP | 2004-028243 A | 1/2004 |
| JP | 3622185 B2 | 2/2005 |
| JP | 3654249 B2 | 6/2005 |
| JP | 2005-224832 A | 8/2005 |
| JP | 2007-147029 A | 6/2007 |
| JP | 3962782 B1 | 8/2007 |
| JP | 2008-045956 A | 2/2008 |
| JP | 2014-518367 A | 7/2014 |
| JP | 2014-167964 A | 9/2014 |
| JP | 2015-187468 A | 10/2015 |
| KR | 10-1510288 B1 | 4/2015 |
| WO | 03/25476 A2 | 3/2003 |
| WO | 2008/135780 A1 | 11/2008 |
| WO | 2013/034455 A1 | 3/2013 |
| WO | 2015/091003 A1 | 6/2015 |
| WO | 2016/125711 A1 | 8/2016 |
| WO | 2017/152045 A1 | 9/2017 |
| WO | 2018/093773 A1 | 5/2018 |
| WO | 2018/093776 A1 | 5/2018 |
| WO | 2018/093781 A1 | 5/2018 |
| WO | 2019/010385 A1 | 1/2019 |
| WO | 2019/014463 A1 | 1/2019 |
| WO | 2019/040885 A1 | 2/2019 |
| WO | 2019/090345 A1 | 5/2019 |
| WO | 2020/112976 A1 | 6/2020 |

OTHER PUBLICATIONS

National Research Council, "Assessment of Research Needs for Advanced Battery Systems", 1982, 203 pages.

https://en.wikipedia.org/wiki/Sodium-sulfur_battery_Jun. 11, 2018, 5 pages.

Hodkinson et al., "Lightweight Electric/Hybrid Vehicle Design", 2001, 4 pages.

Guidotti et al., "Characterization of Vacuum-Multifoil Insulation for Long-Life Thermal Batteries", U.S. Department of Energy, Office of Scientific and Technical Information, Apr. 17, 2000, 3 pages.

Daniel et al., "Handbook of Battery Materials", Wiley-VCH Publishers, 2011, vol. 1, 3 pages.

Database WPI Week 201179 Thomson Scientific, London, GB; AN 2011-N98729 XP002794699, & CN 202 001 825 U (LINS) Oct. 5, 2011 (Oct. 5, 2011).

U.S. Patent Application filed Apr. 23, 2010 by Concept Group Inc., U.S. Appl. No. 12/766,397.

Multifoil Insulation, 2011, 3 pages.

* cited by examiner

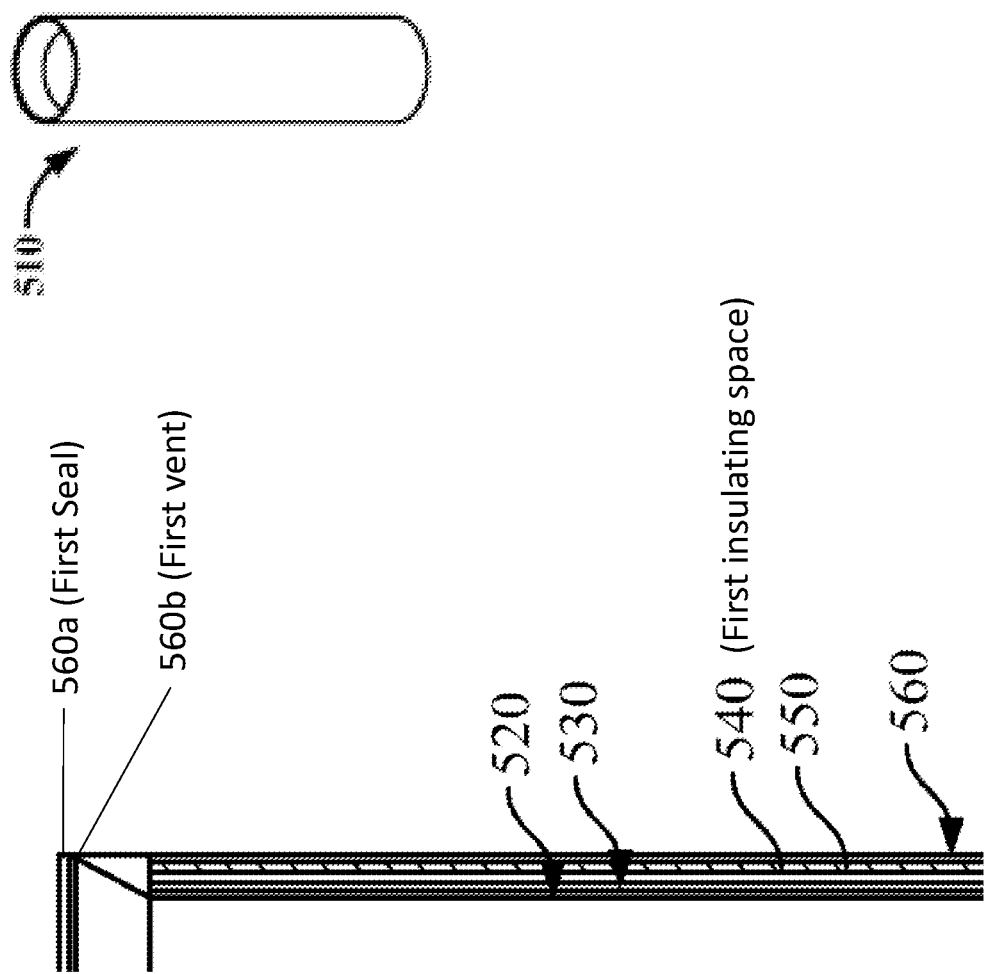

VACUUM INSULATED ARTICLES WITH REFLECTIVE MATERIAL ENHANCEMENT

RELATED APPLICATIONS

The present application claims priority to and the benefit of U.S. patent application 62/303,519, "Vacuum Insulated Articles With Reflective Material Enhancement" (filed Mar. 4, 2016) and U.S. patent application 62/375,953, "Vacuum Insulated Fuel Tank" (filed Aug. 17, 2016), both of which applications are incorporated herein in their entireties for any and all purposes.

TECHNICAL FIELD

The present disclosure relates to the field of vacuum insulated articles.

BACKGROUND

Vacuum-insulated articles have application to a number of fields, including electronics and energy storage applications. In some applications—e.g., energy storage applications—that operate under extreme conditions, improved insulating performance is desirable. Accordingly, there is a need in the art for improved vacuum-insulated articles and related methods of manufacturing such articles.

SUMMARY

In meeting these needs, the present disclosure provides vacuum-insulated articles, comprising: a first wall and an second wall; a first insulating space formed between the first wall and the second wall; a first vent communicating with the first insulating space to provide an exit pathway for gas molecules from the first insulating space, the first vent being sealable for maintaining a first vacuum within the first insulating space following evacuation of gas molecules through the first vent; a first seal sealing the first insulating space at the first vent; and at least one portion of reflective material disposed within the first insulating space.

The present disclosure also provides articles that comprise first and second walls defining a sealed vacuum space disposed therebetween; and at least one portion of reflective material disposed within the sealed vacuum space.

Further provided are methods, the methods suitably comprising forming a vacuum sealed space between first and second walls; and disposing at least one portion of a reflective material in the vacuum sealed space. The methods may further include disposing a plurality of portions of reflective material in the vacuum sealed space. Without being bound to any particular embodiment or theory, the disclosed articles may exhibit insulating performance that is improved by 50, 60, or 70% over some existing articles, depending on the conditions under which the performance is tested.

The present disclosure also provides vacuum-insulated vessels, comprising: a first wall and an second wall defining an first insulating space of reduced pressure disposed between the first and second walls; the second wall enclosing the first wall and the first wall enclosing and defining a storage volume; a first conduit disposed so as to place the storage volume into fluid communication with the environment exterior to the vessel; and a first vent communicating with the first insulating space to provide an exit pathway for gas molecules from the first insulating space, the first vent being sealable for maintaining a first vacuum within the first insulating space following evacuation of gas molecules through the first vent; a first seal sealing the first insulating space at the first vent; and at least one portion of reflective material disposed within the first insulating space.

Further provided are methods, comprising disposing an amount of a fluid into the storage volume of a vessel according to the present disclosure.

Other disclosed methods comprise removing an amount of a fluid from the storage volume of a vessel according to the present disclosure.

Also provided are methods, the methods comprising removing an amount of a fluid from the spillover volume of a vessel according to the present disclosure.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings:

FIG. 5A depicts an exterior and cutaway view of an exemplary article;

DETAILED DESCRIPTION OF ILLUSTRATIVE EMBODIMENTS

Figure 1:
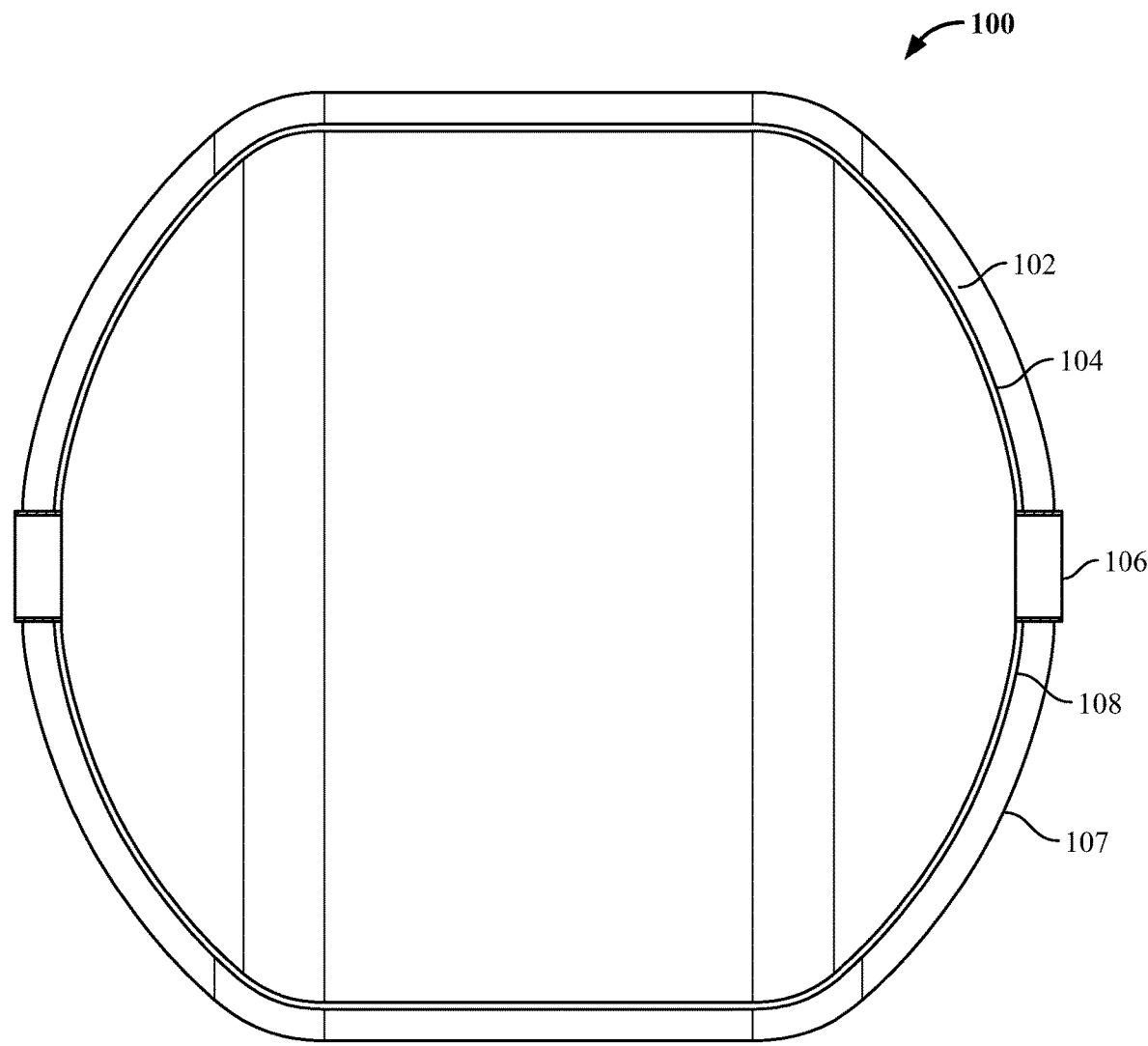
FIG. 1 depicts a cutaway view of an exemplary vessel.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable, and it should be understood that steps may be performed in any order.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

In one aspect, the present disclosure provides vacuum-insulated articles, comprising: a first wall and an second wall; a first insulating space formed between the first wall and the second wall; a first vent communicating with the first insulating space to provide an exit pathway for gas molecules from the first insulating space, the first vent being sealable for maintaining a first vacuum within the first insulating space following evacuation of gas molecules through the first vent; a first seal sealing the first insulating space at the first vent; and at least one portion of reflective material disposed within the first insulating space.

The insulating space may be evacuated, e.g., a vacuum space. Some exemplary vacuum-insulated structures (and related techniques for forming and using such structures) may be found in United States published patent applications 2015/0110548, 2014/0090737, 2012/0090817, 2011/0264084, 2008/0121642, and 2005/0211711, all by A. Reid, and all incorporated herein by reference in their entireties for any and all purposes.

As explained in U.S. Pat. Nos. 7,681,299 and 7,374,063 (incorporated herein by reference in their entireties for any and all purposes), the geometry of the insulating space may be such that it guides gas molecules within the space toward a vent or other exit from the space. The width of the vacuum insulating space need not be not uniform throughout the length of the space. The space may include an angled portion such that one surface that defines the space converges toward another surface that defines the space. As a result, the distance separating the surfaces may vary adjacent the vent such the distance is at a minimum adjacent the location at which the vent communicates with the vacuum space. The interaction between gas molecules and the variable-distance portion during conditions of low molecule concentration serves to direct the gas molecules toward the vent.

The molecule-guiding geometry of the space provides for a deeper vacuum to be sealed within the space than that which is imposed on the exterior of the structure to evacuate the space. This somewhat counterintuitive result of deeper vacuum within the space is achieved because the geometry of the present invention significantly increases the probability that a gas molecule will leave the space rather than enter. In effect, the geometry of the insulating space functions like a check valve to facilitate free passage of gas molecules in one direction (via the exit pathway defined by vent) while blocking passage in the opposite direction.

Another benefit associated with the deeper vacuums provided by the geometry of insulating space is that it is achievable without the need for a getter material within the evacuated space. The ability to develop such deep vacuums without a getter material provides for deeper vacuums in devices of miniature scale and devices having insulating spaces of narrow width where space constraints would limit the use of a getter material.

Other vacuum-enhancing features may also be included, such as low-emissivity coatings on the surfaces that define the vacuum space. The reflective surfaces of such coatings, generally known in the art, tend to reflect heat-transferring rays of radiant energy. Limiting passage of the radiant energy through the coated surface enhances the insulating effect of the vacuum space.

In some embodiments, an article may comprise first and second walls spaced at a distance to define an insulating space therebetween and a vent communicating with the insulating space to provide an exit pathway for gas molecules from the insulating space. The vent is sealable for maintaining a vacuum within the insulating space following evacuation of gas molecules through the vent. The distance between the first and second walls is variable in a portion of the insulating space adjacent the vent such that gas molecules within the insulating space are directed towards the vent during evacuation of the insulating space. The direction of the gas molecules towards the vent imparts to the gas molecules a greater probability of egress than ingress with respect to the insulating space, thereby providing a deeper vacuum without requiring a getter material in the insulating space.

The construction of structures having gas molecule guiding geometry according to the present invention is not limited to any particular category of materials. Suitable materials for forming structures incorporating insulating spaces according to the present invention include, for example, metals, ceramics, metalloids, or combinations thereof.

The convergence of the space provides guidance of molecules in the following manner. When the gas molecule concentration becomes sufficiently low during evacuation of the space such that structure geometry becomes a first order effect, the converging walls of the variable distance portion of the space channel gas molecules in the space toward the vent. The geometry of the converging wall portion of the vacuum space functions like a check valve or diode because the probability that a gas molecule will leave the space, rather than enter, is greatly increased.

The effect that the molecule-guiding geometry of structure has on the relative probabilities of molecule egress versus entry may be understood by analogizing the converging-wall portion of the vacuum space to a funnel that is confronting a flow of particles. Depending on the orientation of the funnel with respect to the particle flow, the number of particles passing through the funnel would vary greatly. It is clear that a greater number of particles will pass through the funnel when the funnel is oriented such that the particle flow first contacts the converging surfaces of the funnel inlet rather than the funnel outlet.

Various examples of devices incorporating a converging wall exit geometry for an insulating space to guide gas particles from the space like a funnel are provided herein. It should be understood that the gas guiding geometry of the invention is not limited to a converging-wall funneling construction and may, instead, utilize other forms of gas molecule guiding geometries.

A vacuum insulated article may include an outer (second) wall and inner (first) wall, the volume between the inner (first) wall and outer (second) walls wall forming a first insulating space. (As described elsewhere herein, the insulating space may be sealed against the environment exterior to the insulating space.) The article may include a first circular ring arranged between the inner (first) wall and the outer (second) wall, the first circular ring having a first beveled edge circularly arranged around the first circular ring facing at least one of the inner (first) wall and the outer (second) wall, and a first vent formed at the first beveled edge communicating with the first insulating space. The vacuum insulated article may further include a first circular insulation seal sealing the first insulating space at the first vent. Further discussion of this exemplary structure may be found in United States published patent application no. 2015/0260332, the entirety of which is incorporated herein by reference for any and all purposes.

It should be understood that a vacuum (i.e., any vacuum within the disclosed devices and methods) may be effected by the methods in the aforementioned applications or by any other method known in the art.

An insulating space may have a pressure of, e.g., from less than about 760 Torr to about $1\times10^{-7}$ Torr. Pressures of about $10^{-2}$, $10^{-2}$, $10^{-3}$, $10^{-4}$, $10^{-5}$, $10^{-6}$, and about $10^{-7}$ Torr are all considered suitable. An insulating space may be oxide-free or substantially oxide-free. Reflective material within an insulating space may be oxide-free or substantially oxide-free.

An article according to the present disclosure may be formed from materials selected such that the article maintains its shape and integrity at up to about 2500 deg. F., up to about 2400 deg. F., up to about 2300 deg. F., up to about 2200 deg. F., up to about 2100 deg. F., or even up to about 2000 deg. F.

The outer (second) and inner (first) walls may in some embodiments be arranged in a concentric fashion, e.g., inner (first) and outer (second) tubes. Tubes may be circular in cross section, but a tube may also be eccentric, polygonal, or otherwise shaped in cross-section. The tubes may have the same cross-sectional shape, but may also differ in cross-sectional shape. As explained elsewhere herein, the insulating space between the inner (first) and outer (second) walls may be of a constant cross-section, but may also be of a varying cross section.

Walls may also be flat, curved, or otherwise shaped. One wall may be flat and the other wall may be curved. Walls may be cylindrical in shape, but may also be cupped or otherwise shaped, e.g., to form the cap or bottom of a cylindrical article. An article may be planar, curved, spherical, cubic, capsule-shaped, polygonal, cylindrical, or otherwise shaped according to the needs of a user.

The at least one portion of reflective material may be characterized as being a sheet in form. The reflective material may be rectangular or square in shape, but may also be a ribbon or strip in shape, e.g., with an aspect ratio greater than 1, e.g., 2, 3, 4, 5, 6, 7, 8, 9, 10. The reflective material may be wound in a spiral fashion so as to present multiple layers into the space between the first and second walls. Alternatively, the reflective material may be present as multiple, separate portions, e.g., multiple sheets.

In some embodiments, the reflective material is present as a cylinder formed by securing one portion of a sheet of the material to another portion of the sheet of material.

The reflective material may be metallic, e.g., stainless steel or other metals, e.g., a metal in foil form. The reflective material may be, e.g., aluminum, gold, silver, metallized polymeric film, or other low-emittance film. A reflective material may have a thickness in the range of from, e.g., about 0.0001 to about 0.01 inches, from about 0.001 to about 0.1 inches or even from about 0.01 to about 0.05 inches. Sheets of reflective material having a thickness of about 0.0005 inches are considered especially suitable.

The reflective material is suitably reflective in the infrared range. In some embodiments, the reflective material may have an emissivity of less than about 0.4, 0.3, 0.2, 0.15, 0.1, 0.09, 0.08, 0.07, 0.06, 0.05, 0.04, 0.03, 0.02, or even lower for wavelengths in the range of from about 2 or 3 micrometers to about 50, to about 45, to about 40, to about 35, to about 30, to about 25, or even to about 15 or 16 micrometers.

A reflective material may have a coating disposed thereon. Suitable coatings may be reflective and/or non-stick coatings. A coating on a reflective material may be smooth, but may also be patterned or otherwise non-flat so as to prevent sticking or friction between the reflective material and any adjacent components. As one example, dots, stripes, hexagons, triangles, or other patterned shapes may be printed onto the reflective material. Ceramic pastes are considered especially suitable materials for printing onto reflective materials. A reflective material may be smooth in profile, but may also itself be patterned, e.g., dimpled, crinkled, perforated, wrinkled, or otherwise roughened. The pattern may be selected to reduce the amount of rubbing and/or sticking between surfaces of the reflective material or even between the reflective material and a wall. In some embodiments, the reflective material may be present as a single layer. In other embodiments, the reflective material may be present in multiple layers, which may be termed multi-layer insulation (MLI).

A reflective material is suitably a material that experiences little to no outgassing when processed, e.g., when heated, when subjected to vacuum, or even when processed in a vacuum furnace.

An article according to the present disclosure may include multiple layers of comparatively thin, reflective sheets that are separated by spacers; exemplary embodiments are described elsewhere herein in further detail. It should be understood that the spacer material may be disposed between portions of reflective material (e.g., between adjacent sheets of reflective material). Spacer material may also be disposed between a wall of an article and a portion of reflective material so as to reduce or prevent physical contact between the wall and the reflective material.

A spacer material may be flat in profile (e.g., a strip having flat or smooth upper and lower surfaces), but may also be non-flat in profile. As an example, a spacer material may have a surface pattern (e.g., scores, wrinkles, folds, and the like) or even have a roughened surface. The spacer material may also have printed thereon a surface pattern (e.g., a printed ceramic paste) so as to reduce the contact area and/or friction between the spacer material and surfaces that are adjacent to the spacer material.

An article according to the present disclosure may comprise a further sheathing material disposed adjacent to the outer (second) wall, the inner (first) wall, or both. The sheathing material may be woven (e.g., braided), patterned, or both. The sheathing material may be disposed so as to prevent or reduce contact between the reflective material and the first and/or second walls. A sheathing material may be ceramic or formed of other materials.

The disclosed articles may comprise a third wall disposed such that the second wall is between the first and third walls. The third wall may be formed of the same material as the first and/or second walls, although this is not a requirement. An article may comprise a second insulating space disposed between the second and third walls. The second insulating space may be configured as the first insulating space, which is described elsewhere herein.

One or more portions of reflective material may be disposed within the second insulating space. Suitable reflective materials are described elsewhere herein. As one example, an article might include inner (first), middle (second), and outer (third) walls, with a first sealed space between the inner (first) and middle walls and a second sealed space between the middle and outer (second) walls. One or more portions of reflective material may be disposed within the first sealed space, and one or more potions of spacer material may be disposed within the first sealed space. Likewise, one or more portions of reflective material may be disposed within the second sealed space, and one or more potions of spacer material may be disposed within the second sealed space.

Other articles disclosed herein comprise first and second walls defining a sealed vacuum space disposed therebetween; and at least one portion of reflective material disposed within the sealed vacuum space. One or both of the first and second walls may comprise stainless steel.

Suitable walls and wall configurations are described elsewhere herein. Walls may be flat, curved, tubular, polygonal, or otherwise shaped.

A sheathing material may be disposed adjacent to the first wall, disposed adjacent to the second wall, or both. An article may comprise a third wall disposed such that the second wall is between the first and third walls. A second insulating space may be disposed between the second and third walls. One or more portions of reflective material may be disposed within the second insulating space.

The presently disclosed articles are suitable for use in electronic devices (or components thereof), energy storage devices, chemical storage devices, combustion devices, and the like.

Other disclosed methods include forming an evacuated, sealed space between first and second walls; and disposing at least one portion of a reflective material in the vacuum sealed space. The methods may further include disposing a plurality of portions of reflective material in the vacuum sealed space.

Also disclosed are methods. The methods comprise disposing at least one portion of a reflective material in a space between two walls; and giving rise to a sealed vacuum within said space.

The methods may include, e.g., disposing a plurality of portions of reflective material in the vacuum sealed space. The methods may also comprise performing the method so as to give rise to an article according to the present disclosure.

Figure 5B:
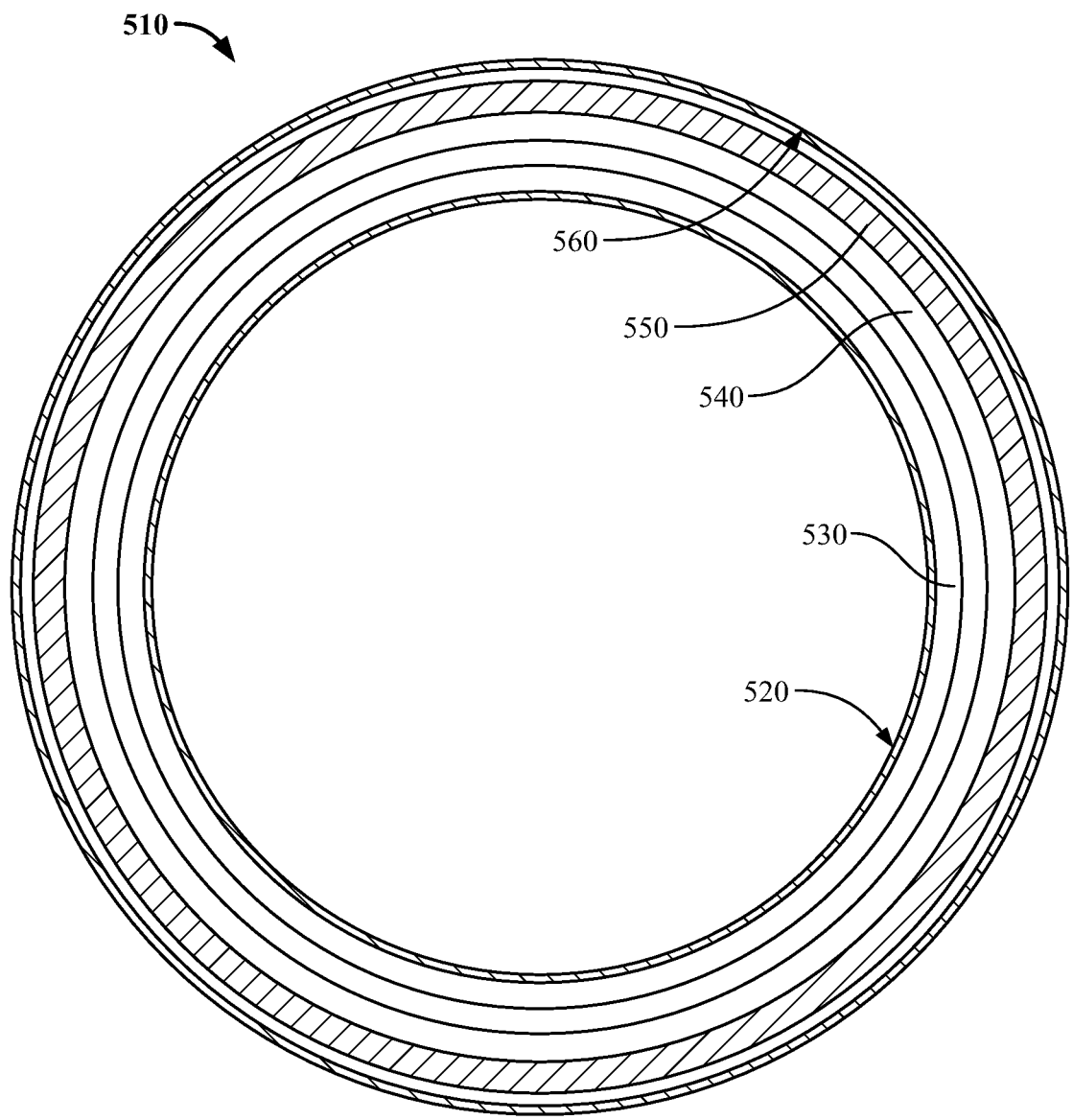
FIG. 5B depicts an exemplary cross-section of the exemplary article of FIG. 5A.

Exemplary articles are provided in FIG. 5A and FIG. 5B. As shown in the upper right of FIG. 5A, an article according to the present disclosure may be tubular in configuration. Articles need not be tubular, however, as they may also be curved, cubic, cup-shaped, or otherwise shaped.

The cutaway view on the left side of FIG. 5A illustrates an article 510 having inner wall (first) 520 and outer (second) wall 560. A vacuum space 540 (also known as a first insulating space) is formed between these walls, which first vacuum space is sealed by first seal 560a at first vent 560b, and an amount (e.g., a spiral sheet) of reflective material 530 is disposed within that space. A sheath material (e.g., a braided ceramic material) 550 may also be present in the space. The sheath material may be present in the form of a sheet, spiral or even a ribbon. Sheath material may be disposed adjacent to the first, second, or both walls of the article.

FIG. 5B provides a cross-sectional view of the article of FIG. 5A. As shown in FIG. 5B, the exemplary article 510 has outer (second) wall 560 and inner (first) wall 520. The sheath material 550 is shown as inside the vacuum space 540 and adjacent to the outer (second) wall 560, though this is not a requirement. The reflective material 540 is disposed between the sheath material 550 and the inner (first) wall 520 of the article 510.

It should be understood that although some embodiments comprise cylindrical form factors, the present disclosure contemplates other form factors. For example, walls may be arranged in a parallel fashion.

Figure 6A:
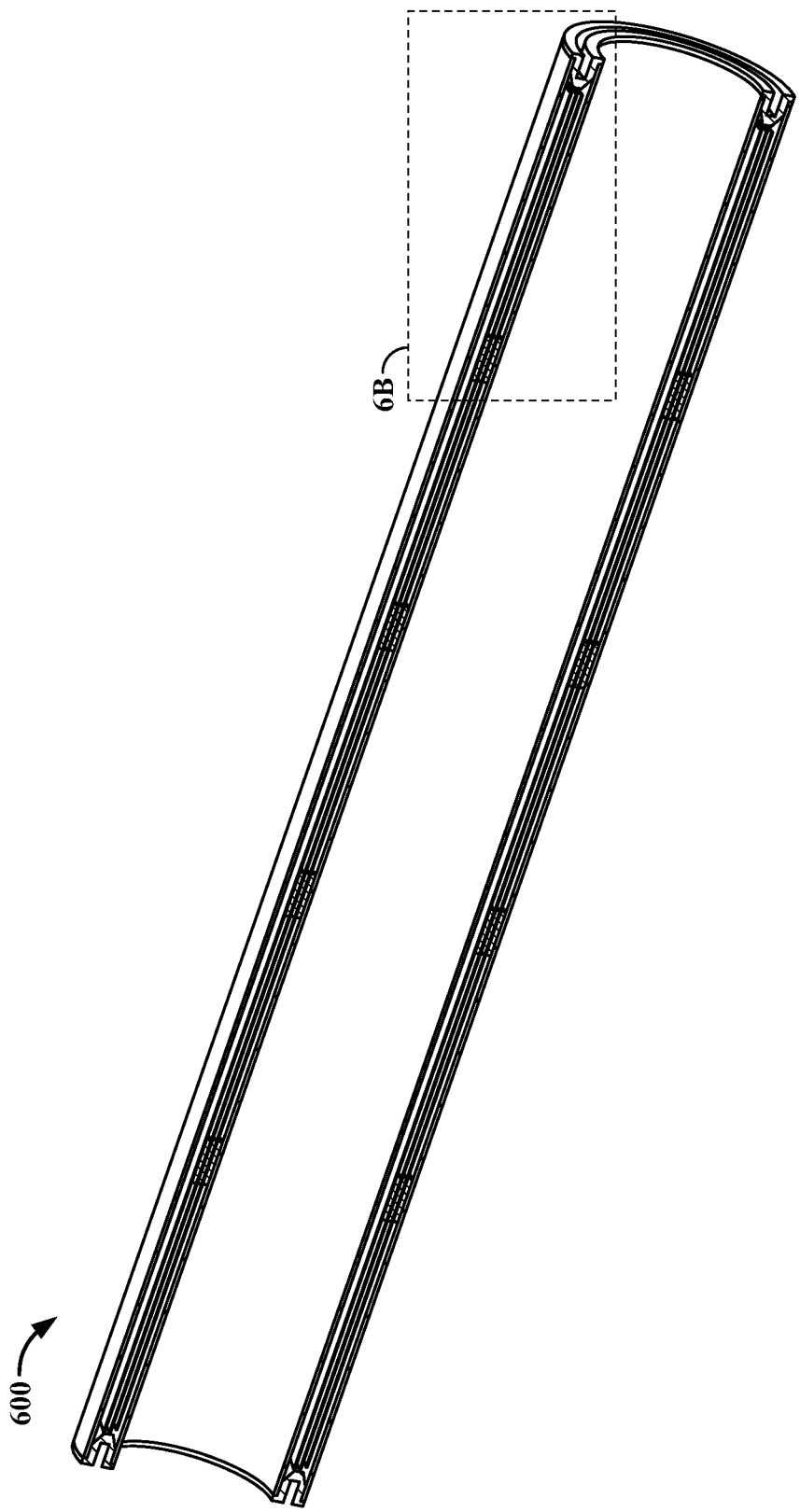
FIG. 6A provides a cutaway view of an exemplary article.

A further exemplary embodiment is shown in FIG. 6A, which FIG. shows a cutaway view of an article 600 according to the present disclosure. At the right-hand side of FIG. 6A is a box, which box outlines the magnified view shown in FIG. 6B.

Figure 6B:
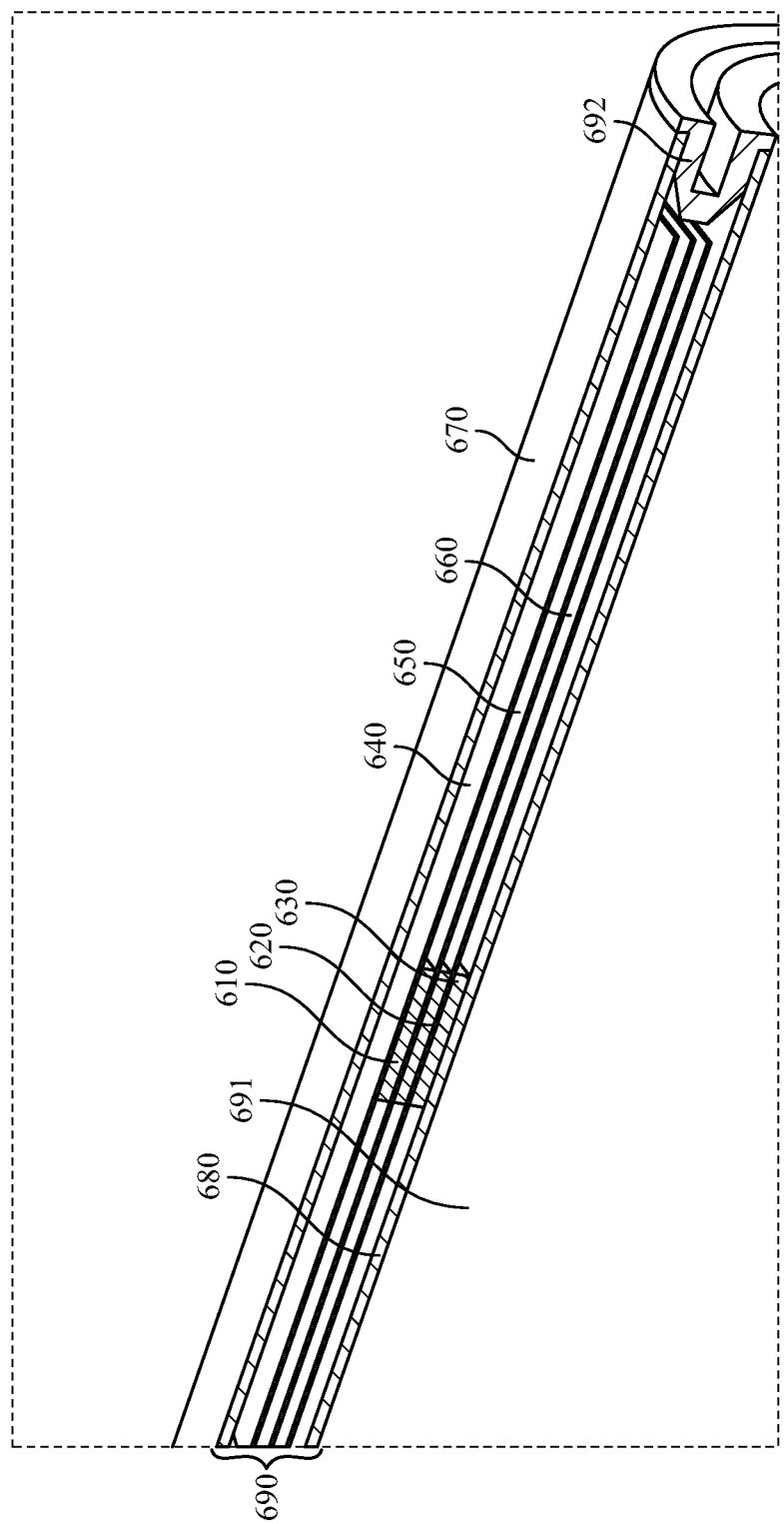
FIG. 6B provides a magnified view of a section of the article of FIG. 6A; and, FIG. 7 provides a cutaway view of an exemplary article.

FIG. 6B presents a magnified view of the boxed area of FIG. 6A. As shown, an article may include an outer (second) wall 670 and an inner (first) wall 680, between which outer (second) wall and inner (first) wall is defined insulating space 690, which insulating space may be evacuated as described elsewhere herein. The inner (first) wall may define within a volume 691. In the exemplary embodiment of FIG. 6B, the inner (first) wall 680 and the outer (second) wall 670 are tubular and concentric with one another, thereby forming a tube having a volume (lumen) within. The article may include end fitting 692, which end fitting serves to seal between inner (first) wall 680 and outer (second) wall 670 so as to define vacuum space 690.

Within vacuum space 690 there may be disposed a first amount 640 of reflective material. As described elsewhere herein, the reflective material may be in the form of a foil or other sheet form. One portion of the reflective material may be secured to another portion of the reflective material so as to form a seal or joint, e.g., to form a tube or cylinder from a sheet or ribbon of reflective material. Within vacuum space 690 there may also be disposed a second amount 650 and a third amount 660 of reflective material.

A spacer material may be disposed between the reflective material and a wall of the article or even between two amounts of reflective material. In exemplary FIG. 6B, first spacer 610 is disposed between first amount 640 of reflective material and second amount 650 of reflective material. Second spacer 620 may be disposed between second amount 650 of reflective material and third amount 660 of reflective material. Third spacer 630 may be disposed between inner (first) wall 680 of the article and third amount 660 of reflective material.

Figure 7:
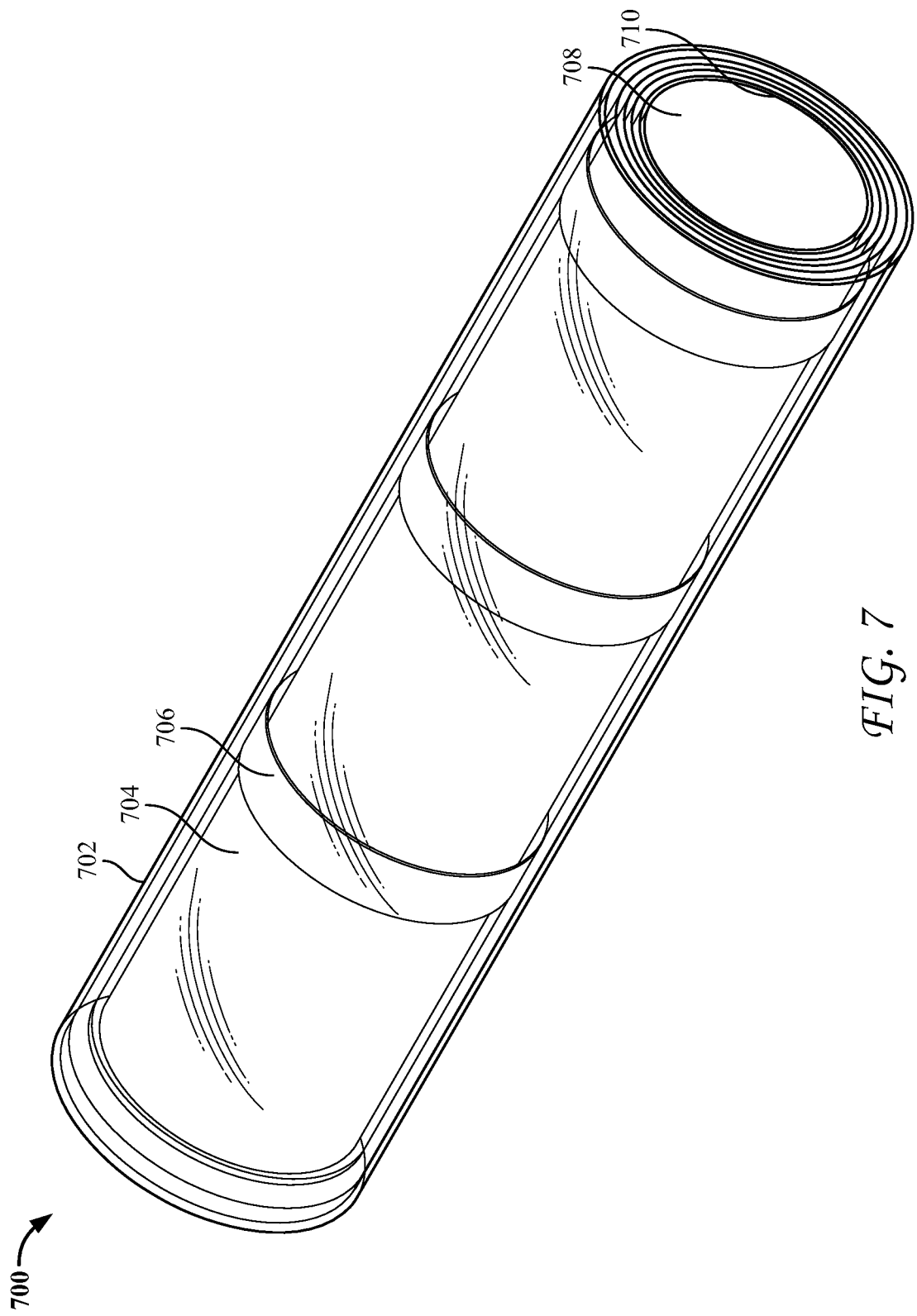

FIG. 7 provides a cutaway view of a further article 700 according to the present disclosure. As shown in FIG. 7, article 700 may include inner (first) wall 710 and outer (second) wall 702, which inner (first) wall and outer (second) wall may define a space (not labeled) (suitably an evacuated space) therebetween. Inner (first) wall 710 may define within a volume 708.

Within the space defined between inner (first) wall 710 and outer (second) wall 702 may be an amount of reflective material 704. A spacer material 706 may be disposed in contact with the reflective material 704.

As shown in FIG. 7, spacer material 706 is present as a ring, encircling reflective material 704. It should be understood that the spacer material need not be present as an encircling ring; spacer material may be present as a spiral (similar to the stripes on a barber's pole). Spacer material may also be present as strips (e.g., rings) that are aligned parallel to the major axis of the article, perpendicular to the major axis of the article, or even at an angle (acute, obtuse, or 45 degrees) relative to the major axis of the article.

The present disclosure provides other, alternative vacuum-insulated vessels, such vessels comprising: a first wall and a second wall defining an first insulating space of reduced pressure disposed between the first and second walls. The second wall suitably encloses the first wall, and the first wall encloses and defines a storage volume.

A vessel may also comprise a first conduit disposed so as to place the storage volume into fluid communication with the environment exterior to the vessel. Vessels may also include a first vent communicating with the first insulating space to provide an exit pathway for gas molecules from the first insulating space, the first vent being sealable for maintaining a first vacuum within the first insulating space following evacuation of gas molecules through the first vent; a first seal sealing the first insulating space at the first vent; and at least one portion of reflective material disposed within the first insulating space.

The insulating space may be evacuated, e.g., a vacuum space. Some exemplary vacuum-insulated structures (and related techniques for forming and using such structures) are described elsewhere herein.

It should be understood that a vacuum (i.e., any vacuum within the disclosed devices and methods) may be effected by the methods in the aforementioned applications or by any other method known in the art.

An insulating space may have a pressure of, e.g., from less than about 760 Torr to about $1\times10^{-9}$ Torr. Pressures of about $10^{-1}$, $10^{-2}$, $10^{-3}$, $10^{-4}$, $10^{-5}$, $10^{-6}$, $10^{-7}$, $10^{-8}$, and even about $10^{-9}$ Torr are all considered suitable. An insulating space may be oxide-free or substantially oxide-free.

Reflective material within an insulating space may be oxide-free or substantially oxide-free. The reflective material may reflect UV, IR, or even visible illumination. The reflective material may be present as a strip, sheet, or in other form.

An article according to the present disclosure may be formed from materials selected such that the article maintains its shape and integrity at up to about 2500 deg. F., up to about 2400 deg. F., up to about 2300 deg. F., up to about 2200 deg. F., up to about 2100 deg. F., or even up to about 2000 deg. F.

In a vessel according to the present disclosure, at least one of the first and second walls comprises a curvilinear region. Hemispherical and conical walls are all considered suitable. At least one of the first or second walls may also comprise a linear region.

A vessel may have a tubular or barrel-shaped central portion that features two curved (e.g., hemispherical) portions at either end of the tubular region. A vessel may be spherical, ovoid, cylindrical, or even polygonal (e.g., a six-sided column) in shape.

A vessel may be oblong in shape, with flattened top and bottom portions and curved sidewall portions. A vessel may have flattened portions, curved portions, or any combination of these.

A vessel may also include one or more fittings (e.g., brackets, screw-downs, and the like) that allow the vessel to engage with a device, vehicle, or other modality that requires access to the fluid disposed within the vessel.

The storage volume of the disclosed vessels may be sealed against the environment exterior to the vessel, so as to contain the fluid for use at a later time. A fluid (e.g., hydrogen, helium, nitrogen, oxygen) may be stored within the storage volume. The contents of the storage volume may be pressurized, e.g., pressurized so as to maintain the contents in liquid form. The vessel may accordingly act so as to thermally insulate the contents from the environment exterior to the vessel.

In some embodiments, the first conduit may be insulated, e.g., be vacuum-insulated. (Alternatively, a first conduit may comprise an insulation-filled space between the conduit's inner (first) and outer (second) walls.) The first conduit may comprise a first conduit wall and a second conduit wall, the first and second conduit walls defining therebetween an insulating conduit space of reduced pressure.

The first conduit may also comprise a first vent communicating with the insulating conduit space so as to provide an exit pathway for gas molecules from the insulating conduit space, the first vent being sealable for maintaining a first vacuum within the insulating conduit space following evacuation of gas molecules through the first vent, the first conduit further comprising a first seal sealing the first insulating space at the first vent.

A vessel may also include a baffle wall. The baffle wall may be disposed within the first wall of the vessel, the baffle wall at least partially enclosing the storage volume, and the baffle wall and the first wall of the vessel defining a spillover volume therebetween, the spillover volume being capable of fluid communication with the storage volume.

A vessel may further include a stop flow device configured to interrupt fluid communication between the storage volume and the spillover volume. A valve, stopcock, or other device may be used. A user may recover fluid (e.g., in vapor form) from the spillover volume. The spillover volume may be configured to receive fluid (e.g., fluid that has boiled-off) from the storage volume.

Vessels may also include a spillover conduit, the spillover conduit comprising a first spillover conduit wall and a second spillover conduit wall, the first and second spillover conduit walls defining therebetween an insulating spillover conduit space of reduced pressure.

A spillover conduit may also comprise a first vent communicating with the insulating spillover conduit space so as to provide an exit pathway for gas molecules from the insulating spillover conduit space, the first vent being sealable for maintaining a first vacuum within the insulating spillover conduit space following evacuation of gas molecules through the first vent, the first spillover conduit further comprising a first seal sealing the first insulating space at the first vent.

A vessel may include a jacket material that encloses the vessel. The jacket material may contacts the second wall of the vessel. The jacket material may comprise a woven composite, a braided composite, a non-woven composite, or any combination thereof.

The jacket material may be configured to improve the ability of the vessel to withstand an internal or even an external pressure or external impact. The jacket material may be a composite, e.g., a composite formed from one or more fiber types and one or more polymer matrices. A jacket material may enclose a portion of or even enclose the entire vessel. In some embodiments, the jacket material encloses at least 50% of the surface area of the vessel.

A vessel may also include a fluid disposed within the storage volume. Hydrogen, helium, nitrogen, and other gases are all considered suitable such fluids. The fluid may be in liquid form or in vapor form.

Vessels may also include a heat source in thermal communication with the storage volume. The heat source may be disposed within the vessel, but may also be disposed exterior to the vessel. The heat source may be battery-powered, solar-powered, chemically-powered, or even powered by a reaction of the fluid (e.g., hydrogen) disposed within the vessel.

Also provided are methods. The methods suitably comprise disposing an amount of a fluid into the storage volume of a vessel according to the present disclosure. The fluid may comprise hydrogen. The methods may also include sealing the fluid within the vessel.

Other disclosed methods include removing an amount of a fluid from the storage volume of a vessel according to the present disclosure. The recovery may be assisted by a vacuum; recovery may also be effected by utilizing the pressure of the pressurized fluid within the vessel. The user may also convert some or all of the fluid into electrical, thermal, or even mechanical energy.

Further disclosed methods include removing an amount of a fluid from the spillover volume of a vessel according to the present disclosure. The fluid may comprise hydrogen. The user may also convert some or all of the fluid into electrical, thermal, or even mechanical energy.

The disclosed vessels may be used as fuel tanks for vehicles, e.g., aircraft (manned and unmanned), marine vehicles, automobiles, and the like. The vessels may also be used as fuel tanks for dwellings (temporary and permanent), commercial operations, medical facilities, and the like.

FIG. 1 depicts a cutaway view of an exemplary insulated vessel 100 according to the present disclosure. As shown, the vessel 100 may comprise a vacuum region 102, which vacuum region may be formed between the first (inner) wall 104 and second (outer) wall 107 of the vessel. Inner (first) wall 104 may be considered to define a pressure vessel and a storage volume therein.

The vessel 100 may also include a feedthrough 106; the feedthrough 106 may place the storage volume into fluid communication with the environment exterior to the vessel, e.g., in a fuel tank embodiment wherein a fuel material (e.g., a gas or other fluid) is stored within the storage volume defined within inner (first) wall 108. The feedthrough 106 may comprise a valve, a conduit (including insulated conduits, as described elsewhere herein), or other modality (e.g., a stopper) that modulates fluid movement.

As shown in FIG. 1, vessel 100 may also comprise a reflective material (e.g., a reflective radiation barrier) 108, which may be disposed within the vacuum region. Suitable reflective materials are described elsewhere herein; also as described elsewhere herein, an article may include one or more amounts of spacer material.

Figure 2:
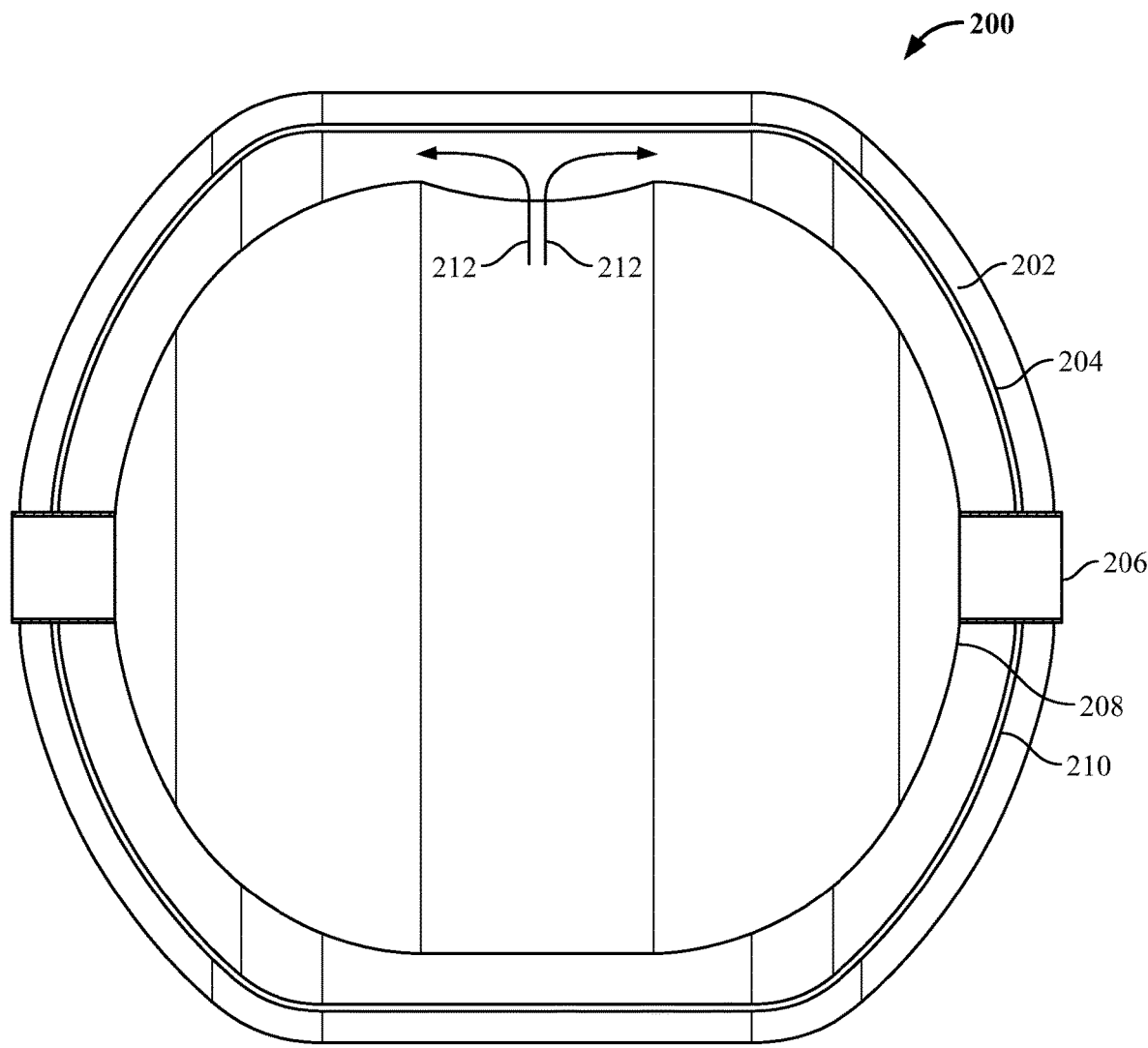
FIG. 2 depicts a cutaway view of an alternative exemplary vessel.

FIG. 2 provides a cutaway view of an alternative vessel 200 according to the instant disclosure. As shown, vessel 200 may include insulating vacuum region 202, which is formed between the first (inner) wall 204 and the second (outer) wall of the vessel (not labeled). Vessel 200 may also include a feedthrough 206; feedthrough 206 may place the storage volume into fluid communication with the environment exterior to the vessel. Feedthrough 206 may comprise a valve, a conduit (including insulated conduits, as described elsewhere herein), or other modality that modulates fluid movement. Vessel 200 may also include a reflective material 210, disposed within the vacuum region.

A vessel 200 may further include a shield (which may be vapor-cooled) or baffle 208 disposed within the device. The baffle may enclose the storage volume, which storage volume may contain a fluid (e.g., hydrogen). The vessel 200 may further define a boil-off flow path 212, which allows vapor to exit from the storage volume within the vessel. This may be used, e.g., when a vessel has disposed within a material that evolves vapor under storage conditions. A vessel may also include a jacket or other shielding disposed on the exterior of the vessel so as to protect the vessel from environmental forces.

Figure 3:
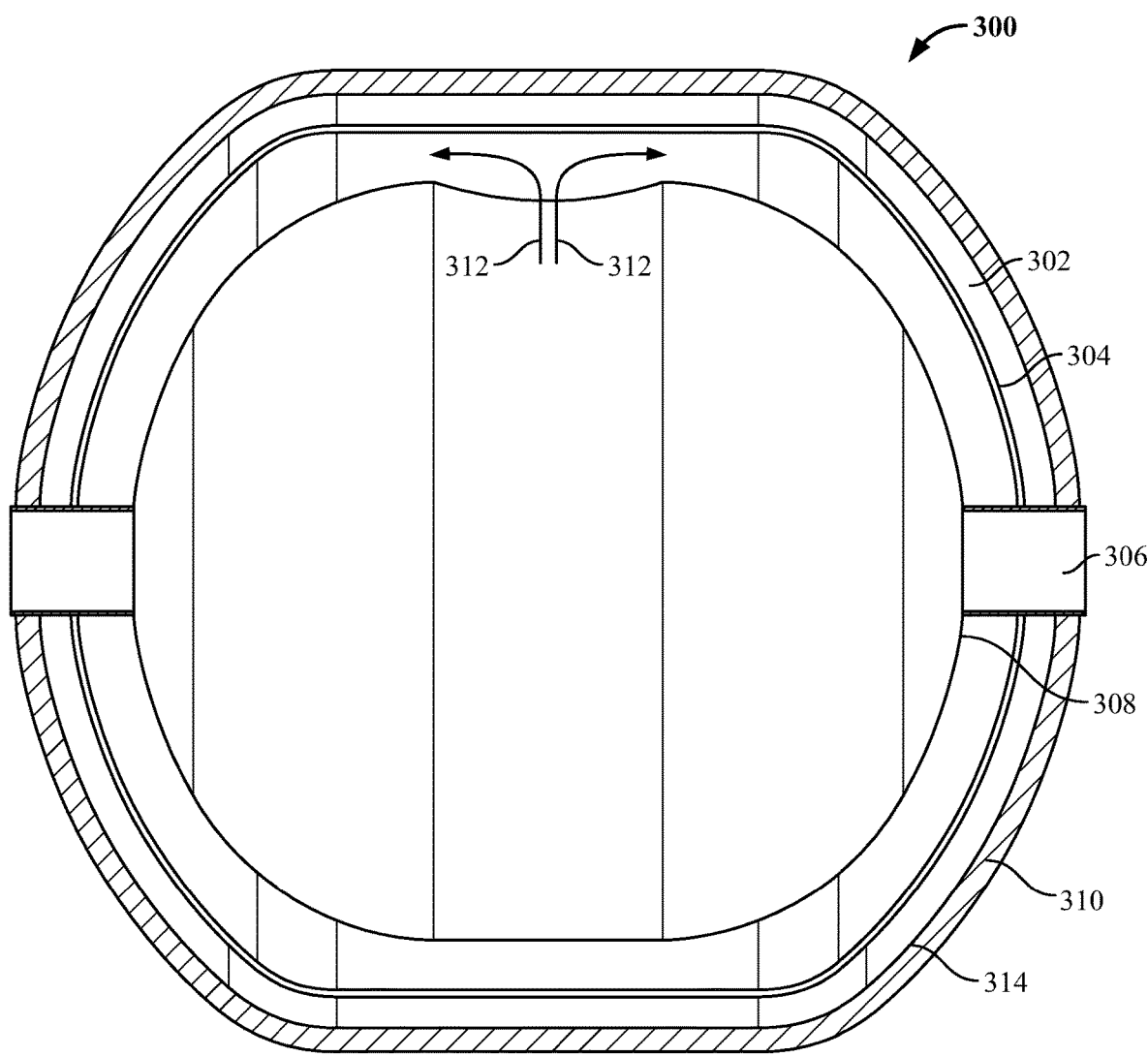
FIG. 3 depicts a cutaway view of an alternative exemplary vessel.

FIG. 3 provides another alternative vessel 300. As shown, the vessel 200 may include insulating vacuum region 302, which is formed between the first (inner) wall 304 and the second (outer) wall of the vessel 314. Vessel 300 may also include a feedthrough 306; the feedthrough 306 may place the storage volume into fluid communication with the environment exterior to the vessel. The feedthrough comprise a valve, a conduit (including insulated conduits, as described elsewhere herein), or other modality that modulates fluid movement. Vessel 300 may also include a reflective material (not shown) disposed within vacuum region 302.

A vessel 300 may further include a vapor cooled shield or baffle 308 disposed within the device. The baffle may enclose the storage volume, which storage volume may contain a fluid (e.g., hydrogen). The vessel 300 may further define a boil-off flow path 312, which allows vapor to exit from the storage volume within the vessel. Vessel 300 may further comprise a jacket material 310.

Figure 4:
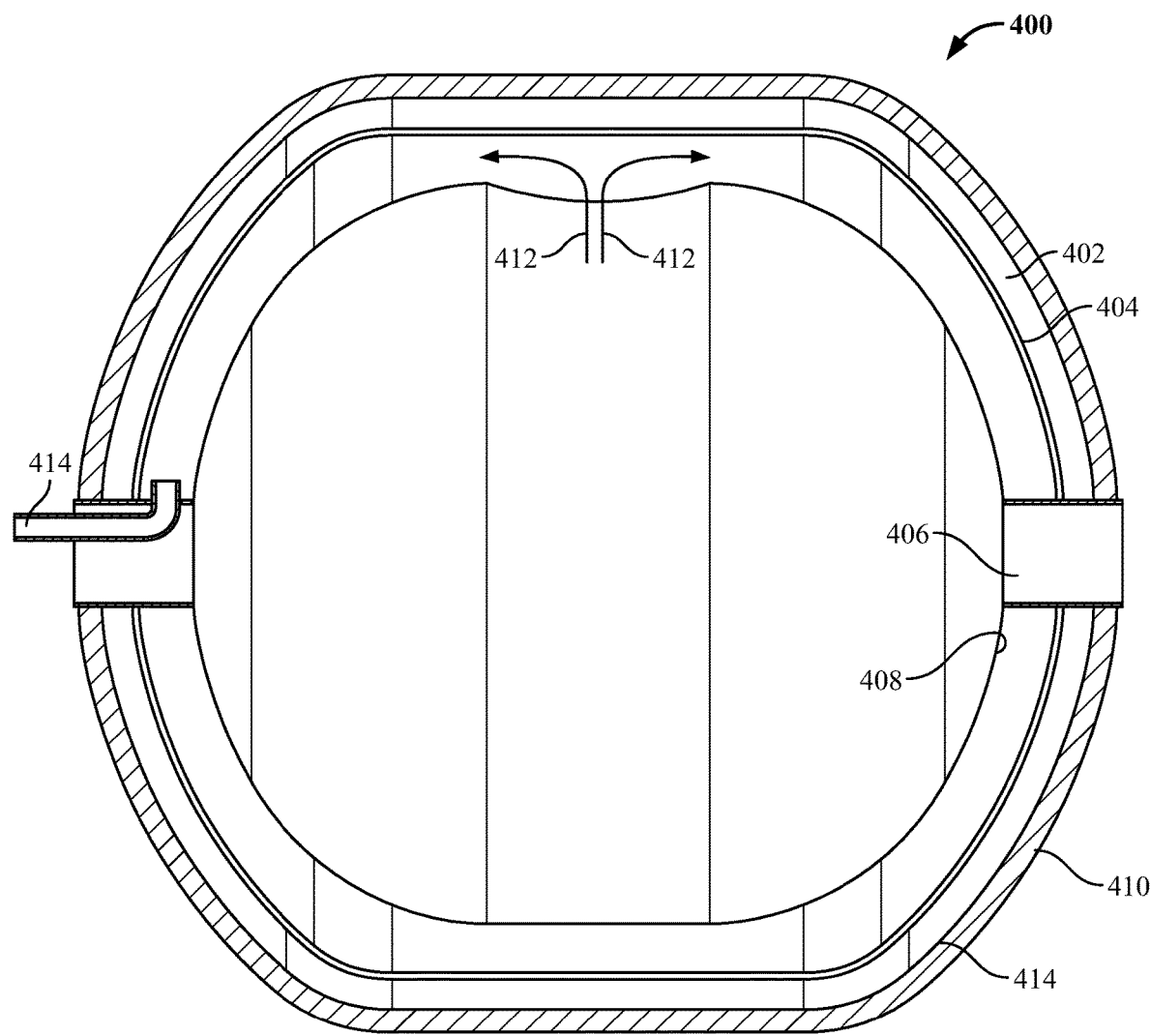
FIG. 4 depicts a cutaway view of an alternative exemplary vessel.

FIG. 4 provides another alternative vessel 400. As shown, the vessel 400 may include insulating vacuum region 402, which is formed between the first (inner) wall 404 and the second (outer) wall 414 of the vessel. Vessel 400 may also include a feedthrough 406; the feedthrough 406 may place the storage volume into fluid communication with the environment exterior to the vessel. The feedthrough comprise a valve, a conduit (including insulated conduits, as described elsewhere herein), or other modality that modulates fluid movement.

Vessel 400 may also include a reflective material (not shown) disposed within the vacuum region.

A vessel 400 may further include a vapor cooled shield or baffle 408 disposed within the device. The baffle may enclose the storage volume, which storage volume may contain a fluid (e.g., hydrogen). The vessel 400 may further define a boil-off flow path 412, which allows vapor to exit from the storage volume within the vessel.

Vessel 400 may further comprise a jacket material 410. Vessel 400 may further comprise a spillover conduit 414, which permits a user to recover vapor or other fluid in the spillover region defined between the baffle 408 and wall 404.

ILLUSTRATIVE EMBODIMENTS

Embodiment 1

A vacuum-insulated article, comprising: a first (inner) wall and an second wall; a first insulating space formed between the outer (second) wall and the inner wall; a first vent communicating with the first insulating space to provide an exit pathway for gas molecules from the first insulating space, the first vent being sealable for maintaining a first vacuum within the first insulating space following evacuation of gas molecules through the first vent; a first seal sealing the first insulating space at the first vent; and at least one portion of reflective material disposed within the first insulating space.

Embodiment 2

The article of embodiment 1, wherein the outer (second) and inner (first) walls are arranged in a concentric fashion.

Embodiment 3

The article of embodiment 1, wherein the outer (second) and inner (first) walls are arranged in a parallel fashion.

Embodiment 4

The article of any of embodiments 1-3, wherein the at least one portion of reflective material is characterized being a sheet in form.

Embodiment 5

The article of any of embodiments 1-4, wherein the at least one portion of reflective material comprises a metal.

Embodiment 6

The article of any of embodiments 1-5, wherein the at least one portion of reflective material comprises a coating disposed thereon.

Embodiment 7

The article of embodiment 6, wherein the coating comprises a non-stick coating.

Embodiment 8

The article of any of embodiments 1-7, wherein the article comprises a plurality of portions of reflective material.

Embodiment 9

The article of any of embodiments 1-8, further comprising a sheathing material disposed adjacent to the outer (second) wall, the inner (first) wall, or both.

Embodiment 10

The article of embodiment 9, wherein the sheathing material is characterized as woven, patterned, or both.

Embodiment 11

The article of any of embodiments 9-10, wherein the sheathing material comprises a ceramic.

Embodiment 12

The article of embodiment 4, wherein the sheet is characterized as being spiral in form.

Embodiment 13

The article of any of embodiments 1-12, wherein the reflective material is characterized as being patterned.

Embodiment 14

The article of any of embodiments 1-13, further comprising a third wall disposed such that second wall is between the first and third walls.

Embodiment 15

The article of embodiment 14, further comprising a second insulating space disposed between the second and third walls.

Embodiment 16

The article of embodiment 15, further comprising a portion of reflective material disposed within the second insulating space.

Embodiment 17

An article, comprising: first and second walls defining a sealed vacuum space disposed therebetween; at least one portion of reflective material disposed within the sealed vacuum space.

Embodiment 18

The article of embodiment 17, wherein at least one of the first and second walls comprises stainless steel.

Embodiment 19

The article of any of embodiments 17-18, wherein at least a portion of the first and second walls are parallel to one another.

Embodiment 20

The article of any of embodiments 17-19, wherein at least one of the first and second walls is curved.

Embodiment 21

The article of any of embodiments 17-20, further comprising a sheathing material disposed adjacent to the first wall, disposed adjacent to the second wall, or both.

Embodiment 22

The article of any of embodiments 17-21, further comprising a third wall disposed such that second wall is between the first and third walls.

Embodiment 23

The article of embodiment 22, further comprising a second insulating space disposed between the second and third walls.

Embodiment 24

The article of embodiment 23, further comprising a portion of reflective material disposed within the second insulating space.

Embodiment 25

The article of any of embodiments 1-24, wherein the first insulating space has a pressure of from about $1\times10^{-4}$ to about $1\times10^{-8}$ Torr.

Embodiment 26

The article of any of embodiments 1-25, wherein the first insulating space is oxide-free.

Embodiment 27

The article of any of embodiments 1-26, wherein the reflective material disposed within the first insulating space is oxide-free.

Embodiment 28

An electronics component, comprising an article according to any of embodiments 1-27.

Embodiment 29

A method, comprising: disposing at least one portion of a reflective material in a space between two walls; and giving rise to a sealed vacuum within said space.

Embodiment 30

The method of embodiment 29, comprising disposing a plurality of portions of reflective material in the vacuum sealed space.

Embodiment 31

The method of embodiment 29, wherein the method gives rise to an article according to any of embodiments 1-27.

Embodiment 32

A vacuum-insulated vessel, comprising: a first wall and an second wall defining an first insulating space of reduced pressure disposed between the first and second walls; the second wall enclosing the first wall and the first wall enclosing and defining a storage volume; a first conduit disposed so as to place the storage volume into fluid communication with the environment exterior to the vessel; and a first vent communicating with the first insulating space to provide an exit pathway for gas molecules from the first insulating space, the first vent being sealable for maintaining a first vacuum within the first insulating space following evacuation of gas molecules through the first vent; a first seal sealing the first insulating space at the first vent; and at least one portion of reflective material disposed within the first insulating space.

Embodiment 33

The vessel of embodiment 32, wherein at least one of the first and second walls comprises a curvilinear region.

Embodiment 34

The vessel of any of embodiments 32-33, wherein at least one of the first and second walls comprises a linear region.

Embodiment 35

The vessel of any of embodiments 32-34, wherein the storage volume is sealed against the environment exterior to the vessel.

Embodiment 36

The vessel of any of embodiments 32-35, wherein the first conduit comprises a first conduit wall and a second conduit wall, the first and second conduit walls defining therebetween an insulating conduit space of reduced pressure.

Embodiment 37

The vessel of embodiment 36, wherein the first conduit comprises a first vent communicating with the insulating conduit space so as to provide an exit pathway for gas molecules from the insulating conduit space, the first vent being sealable for maintaining a first vacuum within the insulating conduit space following evacuation of gas molecules through the first vent, the first conduit further comprising a first seal sealing the first insulating space at the first vent.

Embodiment 38

The vessel of any of embodiments 32-37, further comprising a baffle wall, the baffle wall being disposed within the first wall of the vessel, the baffle wall at least partially enclosing the storage volume, and the baffle wall and the first wall of the vessel defining a spillover volume therebetween, the spillover volume being capable of fluid communication with the storage volume.

Embodiment 39

The vessel of embodiment 38, further comprising a stop flow device configured to interrupt fluid communication between the storage volume and the spillover volume.

Embodiment 40

The vessel of embodiment 39, further comprising a spillover conduit, the spillover conduit comprising a first spillover conduit wall and a second spillover conduit wall, the first and second spillover conduit walls defining therebetween an insulating spillover conduit space of reduced pressure.

Embodiment 41

The vessel of embodiment 40, wherein the spillover conduit comprises a first vent communicating with the insulating spillover conduit space so as to provide an exit pathway for gas molecules from the insulating spillover conduit space, the first vent being sealable for maintaining a first vacuum within the insulating spillover conduit space following evacuation of gas molecules through the first vent, the first spillover conduit further comprising a first seal sealing the first insulating space at the first vent.

Embodiment 42

The vessel of any of embodiments 32-41, further comprising a jacket material that encloses the vessel.

Embodiment 43

The vessel of embodiment 42, wherein the jacket material contacts the second wall of the vessel.

Embodiment 44

The vessel of any of embodiments 42-43, wherein the jacket material comprises a woven composite, a braided composite, a non-woven composite, or any combination thereof.

Embodiment 45

The vessel of any of embodiments 42-44, wherein the jacket material encloses at least 50% of the surface area of the vessel.

Embodiment 46

The vessel of any of embodiments 32-45, further comprising a fluid disposed within the storage volume.

Embodiment 47

The vessel of embodiment 46, wherein the fluid comprises hydrogen.

Embodiment 48

The vessel of any of embodiments 32-47, further comprising a heat source in thermal communication with the storage volume.

Embodiment 49

A method, comprising: disposing an amount of a fluid into the storage volume of a vessel according to any of embodiments 1-17.

Embodiment 50

The method of embodiment 49, wherein the fluid comprises hydrogen.

Embodiment 51

A method, comprising: removing an amount of a fluid from the storage volume of a vessel according to any of embodiments 32-48.

Embodiment 52

A method, comprising: removing an amount of a fluid from the spillover volume of a vessel according to embodiment 38.

Embodiment 53

The method of any of embodiments 51-52, wherein the fluid comprises hydrogen.

What is claimed:

1. A vacuum-insulated article having a shape, comprising:
   a first metallic wall and a second metallic wall;
   a first insulating space having a pressure of less than 760 Torr formed between the first metallic wall and the second metallic wall;
   a vent communicating with the first insulating space to provide an exit pathway for gas molecules from the first insulating space, the vent being sealable for maintaining a first vacuum within the first insulating space following evacuation of gas molecules through the vent;
   a seal sealing the first insulating space at the vent; and
   multiple layers of a metallic reflective material in foil form disposed within the first insulating space, the metallic reflective material having an emissivity of less than 0.4 for wavelengths in the range of from 2 to 50 micrometers,
   the vacuum-insulated article being configured such that the article maintains its shape at up to about 2500 deg. F.

2. The vacuum-insulated article of claim 1, wherein a layer of the metallic reflective material comprises a non-stick coating disposed thereon.

3. The vacuum-insulated article of claim 1, further comprising a sheathing material disposed between a layer of the metallic reflective material and (i) the first metallic wall, (ii) the second metallic wall or (iii) both, and wherein the sheathing material is characterized as woven, braided, nonwoven, or any combination thereof.

4. The vacuum-insulated article of claim 3, wherein the sheathing material comprises a ceramic.

5. The vacuum-insulated article of claim 1, wherein the metallic reflective material is characterized as being patterned.

6. The vacuum-insulated article of claim 1, further comprising a third metallic wall disposed such that the second metallic wall is between the first metallic wall and the third metallic wall.

7. The vacuum-insulated article of claim 6, further comprising a second insulating space having a pressure of less than 760 Torr disposed between the second and third metallic walls.

8. The vacuum-insulated article of claim 7, further comprising a layer of the metallic reflective material disposed within the second insulating space.

9. The article of claim 1, wherein the first insulating space has a pressure of less than 760 Torr to $10^{-9}$ Torr.

10. The vacuum-insulated article of claim 1, wherein a layer of the metallic reflective material comprises at least one of a pattern printed thereon or a non-stick coating.

11. The vacuum-insulated article of claim 1, wherein an end fitting is sealed at a first location to the first metallic wall and at a second location to the second metallic wall so as to seal the first insulating space, wherein the first metallic wall defines a major axis, and wherein the first location and the second location lie along a line extending radially outward from the major axis.

12. The vacuum-insulated article of claim 3, wherein the sheathing material is disposed so as to reduce contact between the layer of the metallic reflective material and the first metallic wall or the second metallic wall.

13. The vacuum-insulated article of claim 1, further comprising a spacer material disposed between adjacent layers of the metallic reflective material.

14. The vacuum-insulated article of claim 13, wherein the spacer material comprises scores, folds, or a surface pattern printed thereon.

15. The vacuum-insulated article of claim 12, further comprising a spacer material disposed between adjacent layers of the metallic reflective material.

16. The vacuum-insulated article of claim 15, wherein the spacer material comprises scores, folds, or a surface pattern printed thereon.

17. The vacuum-insulated article of claim 1, wherein the article is configured such that the article maintains its shape at up to about 2000 deg. F.

* * * * *